(12) United States Patent
Wang et al.

(10) Patent No.: US 10,394,262 B2
(45) Date of Patent: Aug. 27, 2019

(54) VOLTAGE REGULATION METHOD, CONTROLLER, AND CHIP

(71) Applicant: Huawei Technologies Co., Ltd., Shenzhen (CN)

(72) Inventors: Xinru Wang, Shenzhen (CN); Yangyang Tang, Shenzhen (CN); Xin Jin, Shanghai (CN); Zhonglei Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/859,117

(22) Filed: Dec. 29, 2017

(65) Prior Publication Data

US 2018/0188762 A1 Jul. 5, 2018

(30) Foreign Application Priority Data

Dec. 30, 2016 (CN) .......................... 2016 1 1270143

(51) Int. Cl.
*G05F 1/56* (2006.01)
*G06F 1/26* (2006.01)
(Continued)

(52) U.S. Cl.
CPC .................. *G05F 1/56* (2013.01); *G05F 1/46* (2013.01); *G05F 3/16* (2013.01); *G06F 1/26* (2013.01)

(58) Field of Classification Search
CPC ... G05F 1/46; G05F 1/56; G05F 1/565; G05F 1/575; G05F 1/59; G05F 3/16; G06F 1/26
(Continued)

(56) References Cited

U.S. PATENT DOCUMENTS

2011/0316339 A1 12/2011 Trivedi et al.
2013/0234694 A1 9/2013 Chang et al.
(Continued)

FOREIGN PATENT DOCUMENTS

CN 102208875 A 10/2011
CN 103105882 A 5/2013
(Continued)

OTHER PUBLICATIONS

Okuma et al., "0.5-V Input Digital LDO with 98.7% Current Efficiency and 2.7-μA Quiescent Current in 65nm CMOS," IEEE, Institute of Electrical and Electronics Engineers, New York, New York (2010).

*Primary Examiner* — William Hernandez
(74) *Attorney, Agent, or Firm* — Leydig, Voit & Mayer, Ltd.

(57) ABSTRACT

A voltage regulation method, a controller, and a chip are provided. In the method, a controller receives a digital first status representation value sent by a sensor; the controller determines, according to the first status representation value and at least one of a second status representation value or a first expected value, whether to regulate the supply voltage of the load, where the second status representation value represents a node voltage that is at a previous moment and that is of the detection point of the load, and the first expected value represents an expected value of a node voltage of the detection point; and when determining to regulate the supply voltage of the load, the controller sends a digital control signal to a power gating array, to control the power gating array to regulate the supply voltage.

17 Claims, 7 Drawing Sheets

(51) Int. Cl.
*G05F 1/46* (2006.01)
*G05F 3/16* (2006.01)

(58) Field of Classification Search
USPC .......................................... 327/540, 541, 543
See application file for complete search history.

(56) References Cited

U.S. PATENT DOCUMENTS

| | | |
|---|---|---|
| 2014/0223205 A1 | 8/2014 | Muthukaruppan et al. |
| 2015/0220095 A1 | 8/2015 | Onouchi et al. |
| 2015/0244285 A1 | 8/2015 | Chen et al. |
| 2016/0099707 A1 | 4/2016 | Hirler et al. |
| 2016/0179122 A1 | 6/2016 | Trivedi et al. |
| 2016/0285370 A1 | 9/2016 | Suzuki et al. |
| 2018/0226981 A1* | 8/2018 | Salem .................. H03M 1/462 |

FOREIGN PATENT DOCUMENTS

| | | |
|---|---|---|
| CN | 103135644 A | 6/2013 |
| CN | 104158536 A | 11/2014 |
| CN | 104393755 A | 3/2015 |
| CN | 105004983 A | 10/2015 |
| CN | 105183059 A | 12/2015 |
| CN | 105871192 A | 8/2016 |
| CN | 106849620 A | 6/2017 |
| DE | 102005045530 A1 | 4/2007 |
| JP | 2015136198 A | 7/2015 |
| KR | 20160052920 A | 5/2016 |

* cited by examiner

300

| A controller receives a digital first status representation value sent by a first sensor, where the first status representation value is generated by the first sensor after the first sensor detects a node voltage that is at a current moment and that is of a first detection point of target load | 310 |

| The controller determines, according to the first status representation value and at least one of a second status representation value or a first expected value, whether to regulate a supply voltage of the target load, where the second status representation value represents a node voltage that is at a previous moment and that is of the first detection point of the target load, and the first expected value represents an expected value of a node voltage of the first detection point | 320 |

| When determining to regulate the supply voltage of the target load, the controller sends a digital control signal to a power gating array, to control the power gating array to regulate the supply voltage | 330 |

FIG. 4

VOLTAGE REGULATION METHOD, CONTROLLER, AND CHIP

CROSS-REFERENCE TO RELATED APPLICATION

This application claims priority to Chinese Patent Application No. 201611270143.X, filed on Dec. 30, 2016, which is hereby incorporated by reference in its entirety.

TECHNICAL FIELD

Embodiments of this application relate to the circuit field, and more specifically, to a supply voltage regulation method, a controller, and a chip.

BACKGROUND

With improvement in chip manufacturing technology and an increase in design requirements, chip integration becomes higher, and power consumption becomes a key factor in restricting chip application. An implementation means of reducing power consumption may be to reduce a supply voltage of target load. However, if the supply voltage is excessively low, a running speed of the target load is relatively slow, and an expected performance requirement cannot be implemented.

Therefore, how to control a supply voltage of target load on a chip is an urgent problem to be resolved.

SUMMARY

Embodiments of this application provide a voltage regulation method, a controller, and a chip, so as to implement digital fine control of a node voltage of load on a chip.

According to a first aspect, a supply voltage regulation method is provided, where the method is used to regulate a supply voltage of target load disposed on a chip, where a controller, a first sensor, and a power gating array are further disposed on the chip, the power gating array and the first sensor are separately coupled to the controller, the first sensor is configured to detect a node voltage that is at a current moment and that is of a first detection point of the target load, to generate a digital first status representation value, and the power gating array is configured to provide a supply voltage for the target load; and the method includes: receiving, by the controller, the first status representation value sent by the first sensor; determining, by the controller according to the first status representation value and at least one of a second status representation value or a first expected value, whether to regulate the supply voltage of the target load, where the second status representation value represents a node voltage that is at a previous moment and that is of the first detection point of the target load, and the first expected value represents an expected value of a node voltage of the first detection point; and when determining to regulate the supply voltage of the target load, sending, by the controller, a digital control signal to the power gating array, to control the power gating array to regulate the supply voltage.

Therefore, the controller obtains the digital first status representation value sent by the sensor, where the digital first status representation value is used to represent the node voltage that is at the current moment and that is of the first detection point of the target load; and when determining to regulate the voltage of the target load, sends the digital control signal to the power gating array, so that full digital voltage regulation may be implemented, for example, an inner voltage of the target load is digitally monitored, and a voltage is digitally controlled. The full digital voltage regulation can resolve a problem that an on-chip power supply requires a digital-analog mixed design, and is easy to integrate and use. In addition, whether to regulate the supply voltage of the target load may be determined according to the first status representation value and the at least one of the second status representation value that is used to represent the node voltage of the detection point at the previous moment or the expected value of the node voltage of the detection point. It may be implemented to regulate the supply voltage with reference to the status representation value for the previous node voltage and the status representation value for the current node voltage, and this may avoid frequent changes of the node voltage of the target load that is caused by frequent regulation of the supply voltage. In addition, the supply voltage of the target load may be regulated with reference to the status representation value for the current node voltage and the expected value of the node voltage, so that the node voltage of the target load can further approach the expected value, so as to implement precise regulation of the supply voltage of the target load.

Further, because a digital signal is transmitted, a transmission rate is relatively high. For example, there may be a GHz running rate, a loop delay is relatively short, so that there are features of high transmission bandwidth and quick feedback.

In addition, in this embodiment of this application, because of an advantage of high transmission bandwidth, in a scenario in which switching needs to be performed quickly, voltage-frequency quick switching can be effectively supported by consuming fewer resources.

In addition, the controller, the target load, the sensor, and the power gating array are integrated on the chip, so as to implement on-chip management.

Optionally, reference load and a second sensor coupled to the controller are further disposed on the chip, where a supply voltage of the reference load is a constant voltage, and the second sensor is configured to detect a node voltage that is at a current moment and that is of a second detection point of the reference load, to generate a third status representation value; and the method further includes: obtaining, by the controller, the third status representation value from the second sensor, and regulating a second expected value according to a variation of the third status representation value relative to a fourth status representation value, to obtain the first expected value, where the fourth status representation value represents an initial node voltage of the second detection point, and the second expected value represents an initial expected value of the node voltage of the first detection point; or the fourth status representation value represents a node voltage of the second detection point at a previous moment, and the second expected value represents an expected value that is at a previous moment and that is of the node voltage of the first detection point.

Therefore, in this embodiment of this application, the supply voltage of the reference load is a constant voltage, but a node voltage detected on the target load may change according to an environment factor, for example, a temperature factor and an aging factor. The expected value of the node voltage of the target load is regulated according to a variation of the status representation value that is used to represent the node voltage and that is of the reference load, so that the sensor effectively tracks a change of the environment.

It should be understood that, in this embodiment of this application, if it is not required to maintain stability of the node voltage of the target load, but ensure normal running of the target load, the reference load may not be disposed.

Optionally, the regulating a second expected value according to a variation of the third status representation value relative to a fourth status representation value, to obtain the first expected value includes: regulating, by the controller, the second expected value by using the following formula, to obtain the first expected value: $y=y_0+c(m-m_0)$, where y indicates the first expected value, $y_0$ indicates the second expected value, m indicates the third status representation value, $m_0$ indicates the fourth status representation value, and c is a constant.

Optionally, the determining whether to regulate the supply voltage of the target load includes: determining, by the controller, a reference parameter by using the following formula: $t=a(x-y)+b(x-z)$, where t is the reference parameter, x is the first status representation value, y is the first expected value, z is the second status representation value, and a and b are constants; and determining, by the controller according to the reference parameter, whether to regulate the supply voltage of the target load.

Optionally, the determining whether to regulate the supply voltage of the target load includes: when an absolute value of the reference parameter is greater than or equal to a first preset value, determining, by the controller, to regulate the supply voltage of the target load; or when an absolute value of the reference parameter is less than the first preset value, determining not to regulate the supply voltage of the target load.

Optionally, the power gating array includes at least two resistance switch groups, the at least two resistance switch groups are connected in parallel, each resistance switch group includes at least one resistance switch, and the power gating array and the target load are connected in series; and the sending, by the controller, a digital control signal to the power gating array includes: when the reference parameter is greater than or equal to the first preset value, and is less than a second preset value, sending, by the controller, the control signal to the power gating array according to a preset quantity of to-be-switched resistance switch groups, so that the power gating array switches the preset quantity of resistance switch groups according to the control signal.

Optionally, the power gating array includes at least two resistance switch groups, the at least two resistance switch groups are connected in parallel, each resistance switch group includes at least one resistance switch, and the power gating array and the target load are connected in series; and the sending, by the controller, a digital control signal to the power gating array includes: when the reference parameter is greater than or equal to the second preset value, determining, by the controller according to the reference parameter, a quantity of resistance switch groups that need to be switched, and sending the control signal to the power gating array according to the determined quantity of resistance switch groups that need to be switched, so that the power gating array switches, according to the control signal, the quantity of resistance switch groups determined by the controller.

Optionally, a detection point at which the sensor detects a node voltage of the target load may be located inside the target load, for example, may be located at a geometrical center of the target load, or may be located near a lowest drop point of the voltage of the target load.

According to a second aspect, a controller is provided, the controller is disposed on a chip, where target load, a first sensor, and a power gating array are further disposed on the chip, the power gating array and the first sensor are separately coupled to the controller, the first sensor is configured to detect a node voltage that is at a current moment and that is of a first detection point of the target load, to generate a digital first status representation value, and the power gating array is configured to provide a supply voltage for the target load; and the controller includes: a receiving circuit, configured to receive the first status representation value sent by the first sensor; a determining circuit, configured to determine, according to the first status representation value and at least one of a second status representation value or a first expected value, whether to regulate the supply voltage of the target load, where the second status representation value represents a node voltage that is at a previous moment and that is of the first detection point of the target load, and the first expected value represents an expected value of a node voltage of the first detection point; and a control circuit, configured to: when the determining circuit determines to regulate the supply voltage of the target load, send a digital control signal to the power gating array, to control the power gating array to regulate the supply voltage.

Optionally, reference load and a second sensor coupled to the controller are further disposed on the chip, where a supply voltage of the reference load is a constant voltage, and the second sensor is configured to detect a node voltage that is at a current moment and that is of a second detection point of the reference load, to generate a third status representation value; and the controller further includes: a regulation circuit, configured to obtain the third status representation value from the second sensor, and regulate a second expected value according to a variation of the third status representation value relative to a fourth status representation value, to obtain the first expected value, where the fourth status representation value represents an initial node voltage of the second detection point, and the second expected value represents an initial expected value of the node voltage of the first detection point; or the fourth status representation value represents a node voltage of the second detection point at a previous moment, and the second expected value represents an expected value that is at a previous moment and that is of the node voltage of the first detection point.

Optionally, the regulation circuit is further configured to regulate the second expected value by using the following formula to obtain the first expected value: $y=y_0+c(m-m_0)$, where y indicates the first expected value, $y_0$ indicates the second expected value, m indicates the third status representation value, $m_0$ indicates the fourth status representation value, and c is a constant.

Optionally, the determining circuit is further configured to: determine a reference parameter t by using the following formula: $t=a(x-y)+b(x-z)$, where t is the reference parameter, x is the first status representation value, y is the first expected value, z is the second status representation value, and a and b are constants; and determine, according to the reference parameter, whether to regulate the supply voltage of the target load.

Optionally, the determining circuit is further configured to: when an absolute value of the reference parameter is greater than or equal to a first preset value, determine to regulate the supply voltage of the target load; or when an absolute value of the reference parameter is less than the first preset value, determine not to regulate the supply voltage of the target load.

Optionally, the power gating array includes at least two resistance switch groups, the at least two resistance switch groups are connected in parallel, each resistance switch group includes at least one resistance switch, and the power gating array and the target load are connected in series; and the control circuit is further configured to: when the reference parameter is greater than or equal to the first preset value, and is less than a second preset value, send the control signal to the power gating array according to a preset quantity of to-be-switched resistance switch groups, so that the power gating array switches the preset quantity of resistance switch groups.

Optionally, the power gating array includes at least two resistance switch groups, the at least two resistance switch groups are connected in parallel, each resistance switch group includes at least one resistance switch, and the power gating array and the target load are connected in series; the determining circuit is further configured to: when the reference parameter is greater than or equal to the second preset value, determine, according to the reference parameter, a quantity of resistance switch groups that need to be switched; and the control circuit is further configured to send the control signal to the power gating array according to the determined quantity of resistance switch groups that need to be switched, so that the power gating array switches the quantity of resistance switch groups determined by the controller.

According to a third aspect, a chip is provided, where the chip includes a controller, target load, a first sensor, and a power gating array, where the power gating array and the first sensor are separately coupled to the controller; the first sensor is configured to detect a node voltage that is at a current moment and that is of a first detection point of the target load, to generate a digital first status representation value; the controller is configured to: receive the first status representation value sent by the first sensor; determine, according to the first status representation value and at least one of a second status representation value or a first expected value, whether to regulate a supply voltage of the target load, where the second status representation value represents a node voltage that is at a previous moment and that is of the first detection point of the target load, and the first expected value represents an expected value of a node voltage of the first detection point; and when determining to regulate the supply voltage of the target load, send a digital control signal to the power gating array, to control the power gating array to regulate the supply voltage; and the power gating array is configured to provide a supply voltage for the target load according to the control signal sent by the controller.

Optionally, the chip further includes reference load and a second sensor coupled to the controller, where a supply voltage of the reference load is a constant voltage; and the controller is further configured to: obtain a third status representation value from the second sensor, and regulate a second expected value according to a variation of the third status representation value relative to a fourth status representation value, to obtain the first expected value, where the fourth status representation value represents an initial node voltage of the second detection point, and the second expected value represents an initial expected value of the node voltage of the first detection point; or the fourth status representation value represents a node voltage of the second detection point at a previous moment, and the second expected value represents an expected value that is at a previous moment and that is of the node voltage of the first detection point.

Optionally, the controller is further configured to: regulate the second expected value by using the following formula, to obtain the first expected value: $y=y_0+c(m-m_0)$, where y indicates the first expected value, $y_0$ is the second expected value, m indicates the third status representation value, $m_0$ indicates the fourth status representation value, and c is a constant.

Optionally, the controller is further configured to: determine a reference parameter t by using the following formula: $t=a(x-y)+b(x-z)$, where t is the reference parameter, x is the first status representation value, y is the first expected value, z is the second status representation value, and a and b are constants; and determine, according to the reference parameter, whether to regulate the supply voltage of the target load.

Optionally, the controller is further configured to: when an absolute value of the reference parameter is greater than or equal to a first preset value, determine to regulate the supply voltage of the target load; or when an absolute value of the reference parameter is less than the first preset value, determine not to regulate the supply voltage of the target load.

Optionally, the power gating array includes at least two resistance switch groups, the at least two resistance switch groups are connected in parallel, each resistance switch group includes at least one resistance switch, and the power gating array and the target load are connected in series; the controller is further configured to: when the reference parameter is greater than or equal to the first preset value, and is less than a second preset value, send the control signal to the power gating array according to a preset quantity of to-be-adjusted resistance switch groups; and the power gating array is further configured to switch the preset quantity of resistance switch groups according to the control signal.

Optionally, the power gating array includes at least two resistance switch groups, the at least two resistance switch groups are connected in parallel, each resistance switch group includes at least one resistance switch, and the power gating array and the target load are connected in series; the controller is further configured to: when the reference parameter is greater than or equal to the second preset value, determine, according to the reference parameter, a quantity of resistance switch groups that need to be switched, and send the control signal to the power gating array according to the quantity of resistance switch groups that need to be switched; and the power gating array is further configured to switch the determined quantity of resistance switch groups according to the control signal.

Optionally, the power gating array includes at least two resistance switch groups, the at least two resistance switch groups are connected in parallel, each resistance switch group includes at least one resistance switch, and the power gating array and the target load are connected in series. When the at least two resistance switch groups are closed, the supply voltage of the target load is the largest, and the at least two resistance switch groups are switched in a sequence, so that the supply voltage of the target load is in different ranges.

Optionally, a regulation range of the supply voltage of the target load includes at least two ranges, and different ranges are corresponding to different voltage regulation precision.

Optionally, a regulation range of the supply voltage of the target load includes zero, which is used to stop working of the target load.

Optionally, the resistance switch is a p-channel metal oxide semiconductor (P channel metal oxide semiconductor, PMOS) transistor, an N-channel metal oxide semiconductor (N channel metal oxide semiconductor, NMOS) transistor, or a multiple-threshold complementary metal oxide semiconductor (MT Complementary Metal Oxide Semiconductor, MTCMOS) transistor.

Optionally, the sensor is a digital oscillation ring, and the first status representation value and the second status representation value are oscillation frequencies of the digital oscillation ring.

BRIEF DESCRIPTION OF DRAWINGS

FIG. 4 is a schematic flowchart of a voltage regulation method according to an embodiment of this application;

DESCRIPTION OF EMBODIMENTS

The following describes the technical solutions in the embodiments of this application with reference to the accompanying drawings in the embodiments of this application.

Figure 1:
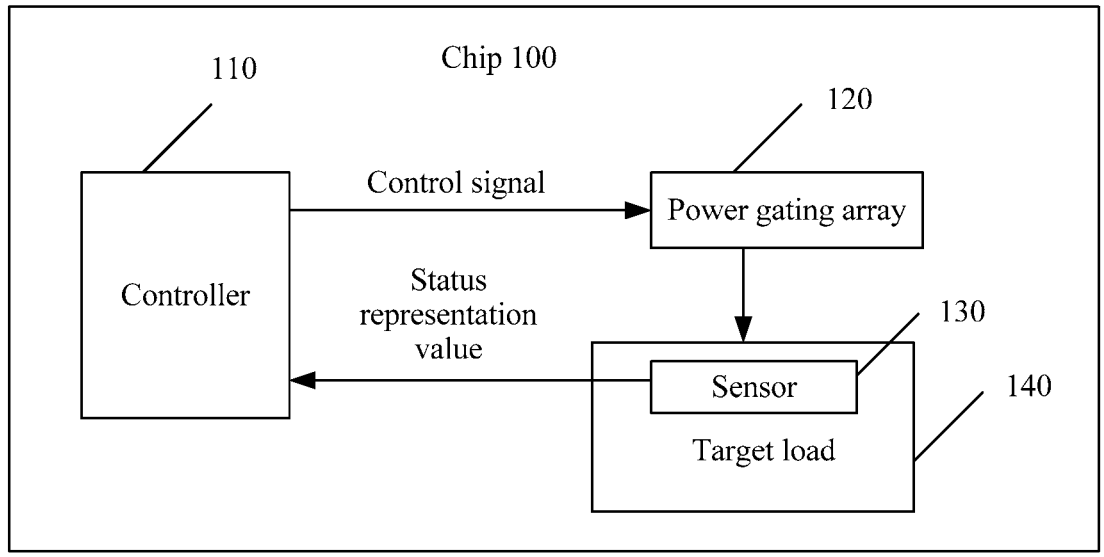
FIG. 1 is a schematic diagram of a chip according to an embodiment of this application.

FIG. 1 is a schematic block diagram of a chip according to an embodiment of this application. As shown in FIG. 1, the chip 100 may include a controller 110, a power gating array 120, a sensor 130, and target load 140.

The power gating array 120 and the sensor 130 are separately coupled to the controller 110.

Optionally, that the power gating array 120 is coupled to the controller 110 may be: the power gating array 120 is directly or indirectly connected to the controller 110.

Optionally, that the sensor 130 is coupled to the controller 110 may be: the sensor 130 is directly or indirectly connected to the controller 110.

As shown in FIG. 1, the sensor 130 may detect a node voltage that is at a current moment and that is of a detection point of the target load 140 on the chip 100, to obtain a status representation value, and send the status representation value to the controller 110, so that the controller 110 can send a control signal to the power gating array 120 according to the status representation value, and the power gating array 120 may provide a supply voltage for the target load according to the control signal.

Optionally, the status representation value may be a digital signal.

Optionally, the control signal may be a digital signal.

Figure 2A:
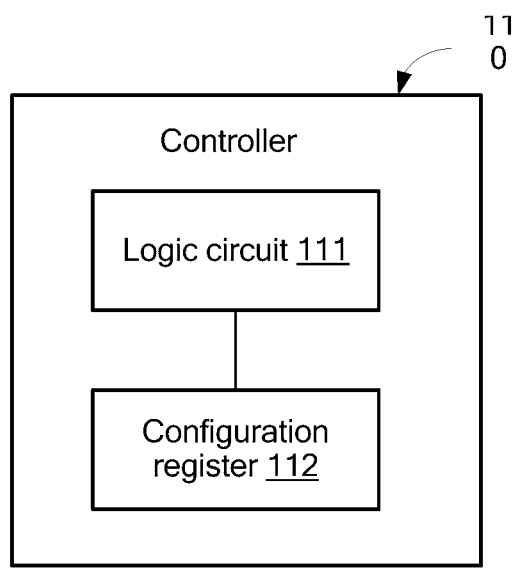
FIG. 2a is a schematic block diagram of a controller according to an embodiment of this application.

Optionally, in this embodiment of this application, as shown in FIG. 2a, the controller 110 may include a logic circuit 111 of hardware, and the logic circuit 111 may be configured to implement the method mentioned in this embodiment of this application.

Optionally, as shown in FIG. 2a, the controller 110 may further include a configuration register 112, and the configuration register 112 may store data required to regulate a supply voltage of the target load, for example, an expected value and an initial value that are of the node voltage of the detection point of the target load.

Figure 2B:
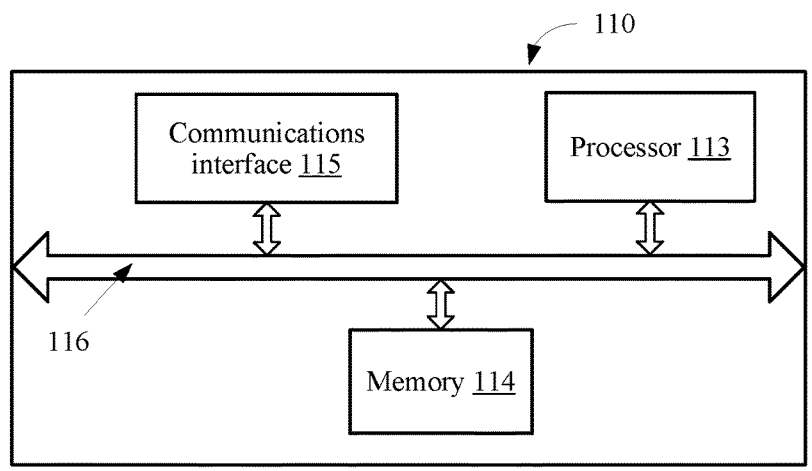
FIG. 2b is a schematic block diagram of a controller according to an embodiment of this application.

Optionally, in this embodiment of this application, as shown in FIG. 2b, the controller 110 may include a processor 113, a memory 114, a communications interface 115, and a bus system 116.

The controller 110 may communicate with the sensor and the power gating array by using the communications interface 115.

The memory 114 may store an operation instruction, and the processor 113 may invoke the operation instruction stored in the memory 114, so that the controller performs the voltage regulation method according to the embodiments of this application.

Optionally, the processor 113 may be an integrated circuit chip, and has a signal processing capability. During implementation, steps in the foregoing method may be completed by using an integrated logic circuit of hardware in the processor 113 or an instruction in a form of software. The foregoing processor 113 may be a general-purpose processor, a digital signal processor (Digital Signal Processor, DSP), an application-specific integrated circuit (Application Specific Integrated Circuits, ASIC), a field programmable gate array (Field Programmable Gate Array, FPGA) or another programmable logic component, a discrete gate or a transistor logic component, or a discrete hardware component; and may implement or perform methods, steps, and logical block diagrams disclosed in the embodiments of this application.

Optionally, the memory 114 may further store data required for a supply voltage regulation method, for example, an initial value and an expected value that are of the status representation value of the target load.

Optionally, the load mentioned in this embodiment of this application may be a circuit formed by at least one logic standard unit circuit, and the circuit may implement a specific function. The logic standard unit circuit may include at least one transistor, and the logic standard unit circuit may implement a function such as and or not.

Optionally, the detection point whose node voltage needs to be detected and that is of the target load may be near a circuit whose node voltage changes frequently, for example, a transistor in a logic standard unit circuit near the detection point flips frequently.

Figure 3:
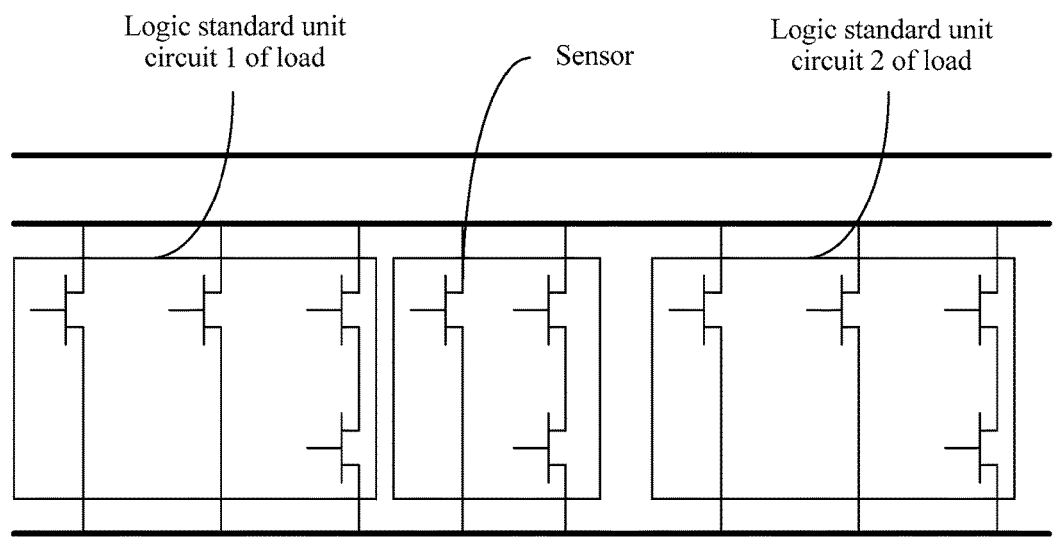
FIG. 3 is a schematic diagram of a manner of disposing a sensor on target load according to an embodiment of this application.

For example, FIG. 3 shows partial circuits of the load. The partial circuits include two logic standard unit circuits, that is, a logic standard unit circuit 1 and a logic standard unit circuit 2. Transistors in the two logic standard unit circuits flip frequently, and a sensor may be disposed near the two logic standard unit circuits. The sensor may also be a circuit formed by a logic representation unit circuit.

Optionally, a node voltage detection point may also be selected in another manner, for example, the detection point may be located at a geometrical center of the load. This is not specifically limited in this embodiment of this application.

It should be understood that, in this embodiment of this application, a node voltage reference point in this application may be disposed at a supply voltage input point, or may be disposed at another point. This is not limited in this embodiment of this application.

FIG. 4 is a schematic flowchart of a voltage regulation method 300 according to an embodiment of this application. As shown in FIG. 4, the method may include steps 310 to 330. The method is used to regulate a supply voltage of target load disposed on a chip. A controller, a first sensor, and a power gating array are further disposed on the chip. The power gating array and the first sensor are separately coupled to the controller. The first sensor is configured to detect a node voltage that is at a current moment and that is of a first detection point of the target load, to generate a digital first status representation value. The power gating array is configured to provide a supply voltage for the target load. Optionally, a structure of the chip may be shown in FIG. 1. The first detection point may be shown in FIG. 3, but this is not limited in this embodiment of this application.

In step 310, the controller receives the digital first status representation value sent by the sensor.

Specifically, the first sensor (for example, the sensor 130) detects the node voltage that is at the current moment and that is of the first detection point of the target load, to generate the digital first status representation value, and the sensor sends the digital first status representation value to the controller, so that the controller can receive the digital first status representation value.

Optionally, in this embodiment of this application, the controller may enable the sensor, so that the sensor detects the node voltage that is at the current moment and that is of the first detection point of the target load.

Optionally, in this embodiment of this application, the sensor may periodically detect the node voltage of the first detection point of the target load in real time. In this case, the current moment may be any moment for periodically collecting the first status representation value.

Alternatively, the sensor may detect the node voltage of the first detection point of the target load in real time after receiving a trigger from the controller. In this case, the current moment may be a moment after a trigger moment of the controller.

Figure 5:
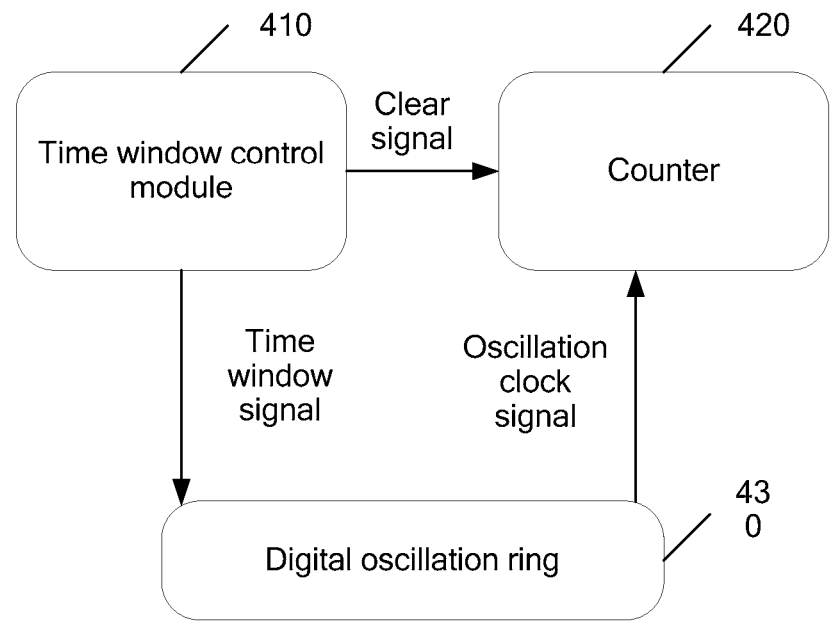
FIG. 5 is a schematic diagram of an oscillation frequency obtaining method according to an embodiment of this application.

For example, as shown in FIG. 5, a time window control module 410 may generate an adjustable time window; an oscillation ring 430 works in the time window, to generate an oscillation clock signal; and a counter 420 may collect a quantity of oscillation times of the oscillation ring in the time window. Before the time window arrives, the time window control module 410 generates a clear signal, and the clear signal resets a result in the counter 420.

Optionally, in this embodiment of this application, the first status representation value may be a voltage, or may be another parameter used to represent a voltage, for example, an oscillation frequency of an oscillator.

Optionally, in this embodiment of this application, the sensor mentioned in this embodiment of this application may be a digital oscillation ring, and the first status representation value may be an oscillation frequency of the digital oscillation ring.

Optionally, after receiving the digital first status representation value, the controller may perform filter processing on the digital first status representation value for subsequent processing, for example, for performing step 320.

In step 320, the controller determines, according to the first status representation value and at least one of a second status representation value or a first expected value, whether to regulate the supply voltage of the target load, where the second status representation value represents a node voltage that is at a previous moment and that is of the first detection point of the target load, and the first expected value represents an expected value of a node voltage of the first detection point.

Optionally, a manner in which the first expected value represents the expected value of the node voltage is the same as a manner in which the first status representation value represents the node voltage at the current moment. For example, the first status representation value may be the oscillation frequency of the digital oscillation ring, and the first expected value is an expected oscillation frequency of the digital oscillation ring.

Optionally, in this embodiment of this application, the first sensor may determine a reference parameter t by using the following formula 1:

$$t=a(x-y)+b(x-z) \qquad \text{formula 1; where}$$

t is the reference parameter, x is the first status representation value, y is the first expected value, z is the second status representation value, and a and b are constants.

The sensor may determine, according to the reference parameter, whether to regulate the supply voltage of the target load.

Optionally, the second status representation value of the target load and the first expected value of the target load may be stored in a memory, and the controller may read them from the memory when the second status representation value and the first expected value need to be used.

Optionally, a and b may be set to 0.

Optionally, values of a and b may be obtained by means of calibration.

Optionally, in this embodiment of this application, when an absolute value of the reference parameter is greater than or equal to a first preset value, it is determined to regulate the supply voltage of the target load.

When an absolute value of the reference parameter is less than the first preset value, it is determined not to regulate the supply voltage of the target load.

It should be understood that, in this embodiment of this application, in addition to that the reference parameter is determined by using the foregoing formula 1 and whether to regulate the supply voltage of the target load is determined according to the reference parameter, in this embodiment of this application, there is another implementation to determine whether to regulate the supply voltage of the target load, and this is not specifically limited in this embodiment of this application.

Optionally, in this embodiment of this application, reference load and a second sensor coupled to the controller are further disposed on the chip. When the controller needs to use an expected value of a voltage of the first detection point to regulate the supply voltage of the target load, the controller may regulate the expected value of the node voltage of the first detection point of the target load according to a change of a status representation value of a node voltage that is of a second detection point of the reference load and that is detected by the second sensor.

Optionally, a supply voltage of the reference load is a constant voltage, and the second sensor is configured to detect a node voltage that is at a current moment and that is of the second detection point of the reference load, to generate a third status representation value. The controller obtains the third status representation value from the second sensor, and regulates a second expected value according to a variation of the third status representation value relative to a fourth status representation value, to obtain the first expected value. The fourth status representation value represents an initial node voltage of the second detection point, and the second expected value represents an initial expected value of the node voltage of the first detection point. Alternatively, the fourth status representation value represents a node voltage of the second detection point at a previous moment, and the second expected value represents an expected value that is at a previous moment and that is of the node voltage of the first detection point.

Optionally, the second detection point may be any node of the reference load, or may be a node whose node voltage changes frequently.

Optionally, the controller regulates the second expected value by using the following formula, to obtain the first expected value:

$$y=y_0+c(m-m_0) \qquad \text{formula 2}$$

y indicates the first expected value, $y_0$ indicates the second expected value, m indicates the third status representation value, $m_0$ indicates the fourth status representation value, and c is a constant.

Optionally, the initial expected value and the fourth status representation value may be preset values, and may be specifically preset during initialization or when the chip starts to work.

Figure 6:
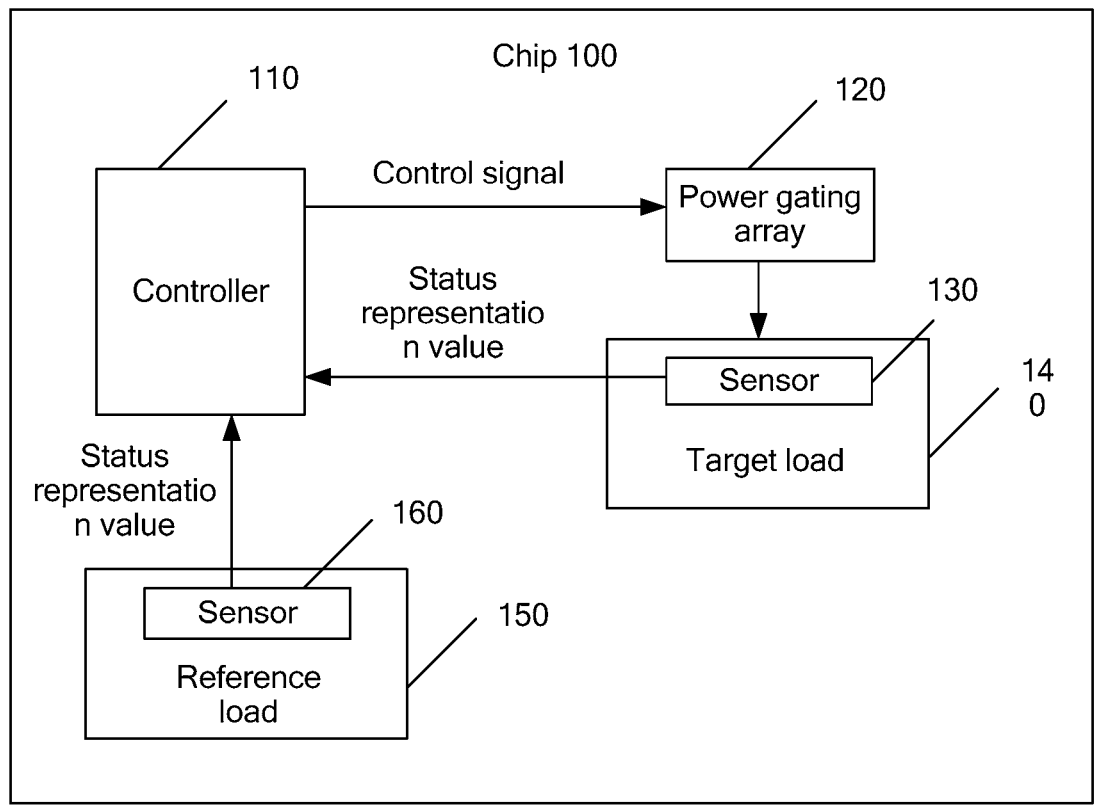
FIG. 6 is a schematic block diagram of a chip according to an embodiment of this application.

For example, as shown in FIG. 6, a sensor 130 may obtain a status representation value that is of a target load 140 and that is used to represent a node voltage of a first detection point at a first moment, and send the status representation value of the target load 140 at the first moment to a controller 110. A sensor 160 may obtain a status representation value that is of reference load 150 and that is used to represent a node voltage of a second detection point at the first moment. The controller 110 may regulate an expected value of the node voltage of the first detection point of the target load 140 in a timely manner with reference to a variation of the status representation value of the reference load at the first moment relative to an initial value, so that the controller 110 can regulate an input voltage of the target load according to a regulated expected value of the node voltage of the target load.

Therefore, in this embodiment of this application, the supply voltage of the load remains unchanged, but the status representation value used to represent the node voltage of the detection point may change according to an environment factor, for example, a temperature factor and an aging factor. The expected value of the node voltage of the detection point of the target load is regulated according to a variation of the status representation value that is of the reference load and that is used to represent the node voltage of the detection point, so that the sensor effectively tracks a change of the environment.

It should be understood that, in this embodiment of this application, if it is not required to maintain stability of the voltage of the target load, but ensure normal running of the target load, and environment and aging impacts on the node voltage of the detection point of the target load are not considered, the reference load may not be disposed.

In step 330, when determining to regulate the supply voltage of the target load, the controller sends a digital control signal to the power gating array, to control the power gating array to regulate the supply voltage.

Optionally, the power gating array regulates the supply voltage of the target load according to the digital control signal.

Optionally, the power gating array includes multiple parallel resistance switches. Voltage division of the target load in a circuit may be regulated by disconnecting or closing all or some resistance switches in the multiple parallel resistance switches that are connected to the target load in series.

Optionally, the power gating array includes multiple parallel resistance switch groups, the power gating array and the target load are connected in series, and each resistance switch group includes at least one resistance switch.

Therefore, voltage division of the target load in a circuit may be regulated by switching a resistance switch group that is connected to the target load in series.

Switching a resistance switch group may be disconnecting a closed resistance switch group, or closing a disconnected resistance switch group.

For example, when the supply voltage of the target load needs to be increased, a larger quantity of resistance switch groups may be closed; and when the supply voltage of the target load needs to be reduced, a larger quantity of resistance switch groups may be disconnected.

Optionally, in this embodiment of this application, the digital control signal may indicate a quantity of to-be-disconnected or to-be-closed resistance switch groups, or is used to indicate a resistance switch group that needs to be disconnected or closed.

Figure 7:
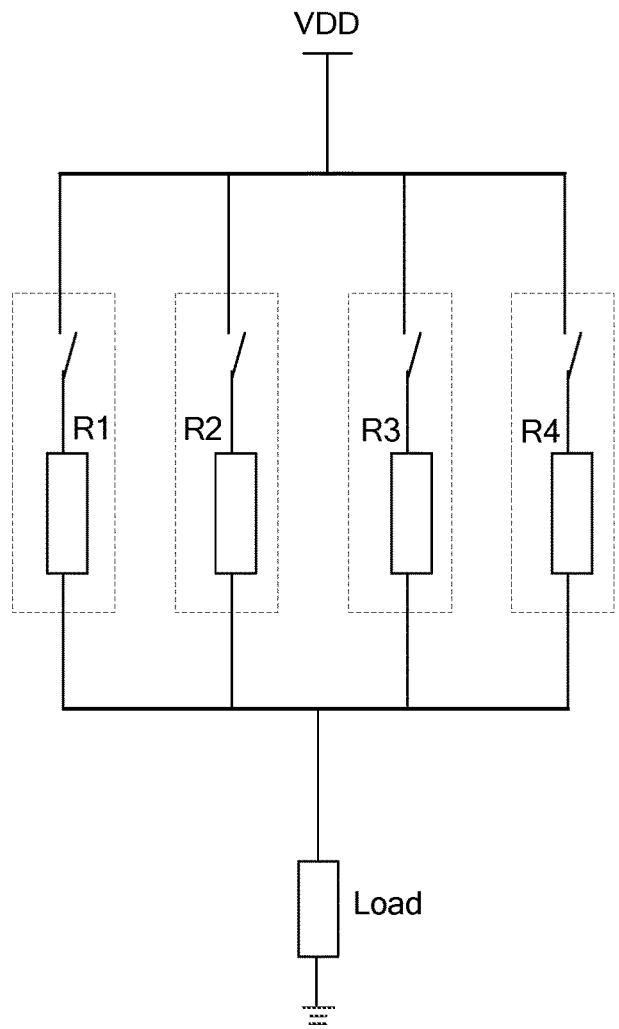
FIG. 7 is a diagram of a connection relationship of resistance switch groups according to an embodiment of this application.

For example, as shown in FIG. 7, the power gating array includes a resistance switch group R1, a resistance switch group R2, a resistance switch group R3, and a resistance switch group R4, and voltage division of the power gating array is regulated by disconnecting or closing a resistance switch group, so that a voltage of the load may be regulated. For example, R1, R2, and R3 are in a closed state each, and R4 is in a disconnected state. If the voltage of the load needs to be increased, R4 may be closed; if the voltage of the load needs to be reduced, at least one of R1, R2, or R3 may be disconnected.

Optionally, in this embodiment of this application, when all the resistance switch groups included in the power gating array are closed, a voltage of the target load is the highest. At least two resistance switch groups may be disconnected or closed in a sequence, to reduce or increase the voltage of the target load, so that the voltage of the target load is in different ranges.

For example, as shown in FIG. 7, R1, R2, and R3 are in a closed state each, and R4 is in a disconnected state. If the voltage of the load needs to be increased, R4 may be closed; if the voltage of the load needs to be reduced, R3 may be disconnected first, and if the voltage of the load needs to be further reduced, R2 may be disconnected.

Optionally, in this embodiment of this application, one resistance switch group includes at least two resistance switches, and the at least two resistance switches may be connected in parallel.

Optionally, in this embodiment of this application, all resistance switches in a resistance switch group may be simultaneously closed or disconnected, and in this case, one resistance switch group may be considered as one resistance switch. In this case, a purpose of disposing a resistance switch group may lie in that same resistance switches are used to design resistance switch groups having different resistances.

Figure 8:
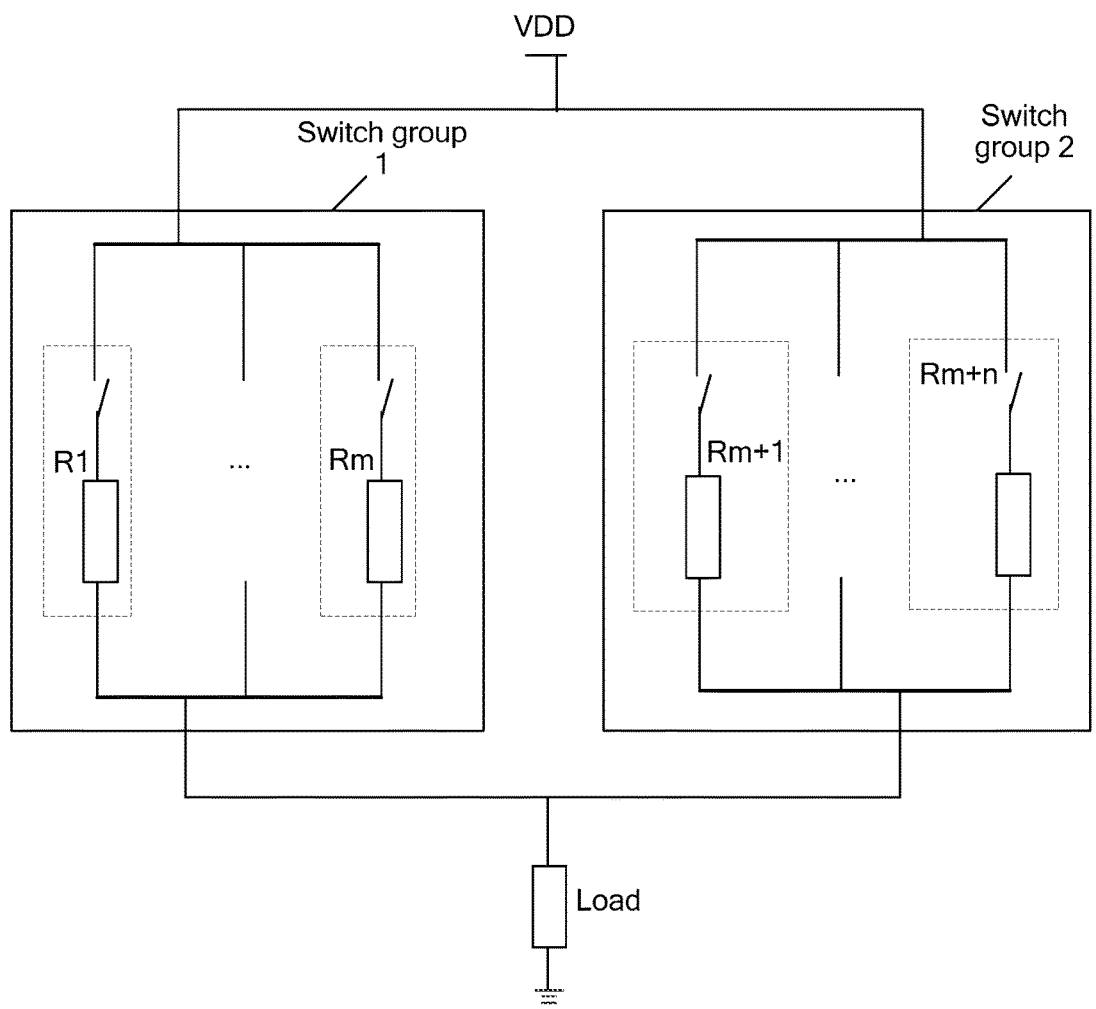
FIG. 8 is a diagram of a connection relationship of resistance switch groups according to an embodiment of this application.

For example, as shown in FIG. 8, the power gating array may include a switch group 1 and a switch group 2, the switch group 1 includes m resistance switches, the switch group 2 includes n resistance switches, and n is not equal to m.

It should be understood that, in this embodiment of this application, a resistance switch in a resistance switch group may be independently controlled. That is, under one control, only some resistance switches in the resistance switch group may be closed or disconnected.

Optionally, the digital control signal may include a signal formed by 0 and 1. A quantity of 0 and 1 may be equal to a quantity of resistance switch groups included in the power gating array, and one 1 or 0 is corresponding to one resistance switch group. 0 may indicate to disconnect a resistance switch group, and 1 may indicate to close a resistance switch group. If a resistance switch group is disconnected, and a value corresponding to the resistance switch group in a corresponding digital control signal is 0, the resistance switch group remains unchanged; if a resistance switch group is disconnected, and a value corresponding to the resistance switch group in a corresponding digital control signal is 1, the resistance switch group is closed.

Optionally, the digital control signal may include only 0 or 1, and is used for only a resistance switch group that needs to be switched. For example, if two resistance switch groups need to be closed, two 1 may be sent to the power gating array, and the power gating array closes the two resistance switch groups in a sequence.

Optionally, in this embodiment of this application, when the foregoing reference parameter determined by using the formula 1 is greater than or equal to the first preset value, and is less than a second preset value, the digital control signal is sent to the power gating array according to a preset quantity of to-be-switched resistance switch groups, and the power gating array switches the preset quantity of resistance switch groups according to the digital control signal.

In an implementation, the controller determines, according to the preset quantity, a resistance switch group that needs to be disconnected or closed, and sends a digital control signal to the resistance switch group that needs to be disconnected or closed, so as to trigger disconnection or closure of the resistance switch group that needs to be connected or closed.

For example, when the reference parameter is greater than or equal to the first preset value, and is less than the second preset value, the preset quantity of resistance switch groups may be disconnected or closed.

For example, if the foregoing reference parameter is a negative value, N resistance switch groups are closed. If the foregoing parameter is a positive value, M resistance switch groups are disconnected.

Optionally, in this embodiment of this application, when the reference parameter is greater than or equal to the second preset value, the digital control signal is sent to the power gating array according to the reference parameter.

When the reference parameter is greater than or equal to the second preset value, a quantity of resistance switch groups that need to be switched is determined according to the reference parameter; the digital control signal is sent to the power gating array according to the quantity of resistance switch groups that need to be switched; and the power gating array switches the determined quantity of resistance switch groups according to the digital control signal.

Optionally, the controller determines, according to the reference parameter, a resistance switch group that needs to be disconnected or closed, and sends the digital control signal to the resistance switch group that needs to be disconnected or closed, so as to trigger disconnection or closure of the resistance switch group that needs to be connected or closed.

For example, when the reference parameter is greater than or equal to the second preset value, n resistance switch groups may be disconnected or closed, where n=c×p, c is a constant, and p is a value of the foregoing reference parameter.

Optionally, a value of c may be obtained by means of calibration.

Optionally, in this embodiment of this application, the foregoing first preset value and second preset value may be obtained by means of calibration.

Optionally, a regulation range of the supply voltage of the target load includes at least two ranges, and different ranges are corresponding to different voltage regulation precision.

For example, as shown in FIG. 8, the power gating array may include a switch group 1 and a switch group 2, the switch group 1 includes m resistance switches, the switch group 2 includes n resistance switches, and n may not be equal to m.

It is assumed that the switch group 1 and the switch group 2 are both disclosed, a voltage of the load is 1 V. If a voltage that can be controlled by the switch group 1 ranges from 0.8 V to 1 V (including 0.8 V and 1 V), and a minimum voltage regulation value is 10 mV, within a range from 0.8 V to 1 V, a voltage may be regulated according to a multiple of 10 mV by regulating disconnection or closure of the resistance switches in the switch group 1 (in this case, all the resistance switches in the switch group 2 are closed). If a voltage that can be controlled by the switch group 2 ranges from 0 V to 0.8 V, and a minimum voltage regulation value is 50 mV, within a range from 0 V to 0.8 V, a voltage may be regulated according to a multiple of 50 mV by regulating disconnection or closure of the resistance switches in the switch group 2 (in this case, all the resistance switches in the switch group 1 are disconnected).

Optionally, in this embodiment of this application, a resistance switch may be a full digital unit, for example, an MTCMOS transistor, and this may effectively resolve an integrated verification problem.

Optionally, in this embodiment of this application, the resistance switches are grouped according to at least one of a quantity of resistance switches, output voltage precision, or a quantity of signals input by the controller.

Specifically, the output voltage precision is a design requirement. Generally, an output voltage is segmented, and precision is different in different voltage ranges. For example, the output voltage is from 0 V to 1 V, within a range from 0.8 V to 1 V, output voltage precision is required to be 10 mV (or higher), and an absolute linearity difference is less than 10 mV (or higher); and within a range from 0 V to 0.8 V, output voltage precision is 50 mV (or lower).

The quantity of resistance switches and the quantity of signals output by the controller may balance a design complexity problem. If the quantity of signals output by the controller is relatively large, a quantity of groups of the resistance switches is relatively large, but each group includes a limited quantity of resistance switches. As a result, each group has small impact on an output voltage, a control algorithm is relatively complicated, and the design is unreasonable.

Therefore, the resistance switches may be grouped by comprehensively considering a design requirement and design complexity and based on at least one of a quantity of resistance switches, output voltage precision, or a quantity of signals output by the controller. The resistance switch groups are connected in parallel. A quantity of signals output by the controller herein is equal to a quantity of resistance switch groups. Resistance switches in one resistance switch group herein are simultaneously disconnected or closed. For example, for one resistance switch group, the controller may send one signal, to control disconnection or closure of the resistance switch group.

It is assumed that an input voltage is vdd, an output voltage is from 0 to vdd2; from 0 to vdd1, output voltage precision needs to be a (mV), and m segments are obtained by means of division; from vdd1 to vdd2, output voltage precision is b (mV), and n segments are obtained by means of division; a target load resistance is Rload, and impedance of each resistance switch group is R(i)pg. A formula for calculating R(i)pg is as follows:

for segment $vdd1$ to $vdd2$: $\Sigma R(i)pg/(\Sigma R(i)pg+R\text{load})$
$=b*i/Vdd, i=1,2 \ldots n;$ and for segment 0 to $vdd1$: $\Sigma R(i)pg/(\Sigma R(i)pg+R\text{load})$
$=b*n+a*(i-n)/Vdd, i=1,2 \ldots m.$ It should be understood that, $\Sigma R(i)pg$ is a sum of resistances obtained after i impedance switch groups are connected in parallel. For example, if there are two impedance switch groups, $\Sigma R(i)pg=R(1)pg\ R(2)pg/(R(1)pg+R(2)pg)$.

A resistance of each resistance switch group is obtained by means of calculation by using the foregoing formula, and then a quantity of resistance switches in each resistance switch group is obtained according to a resistance of a single resistance switch and a parallel connection principle.

Optionally, the resistance switch mentioned in this embodiment of this application may be an MTCMOS transistor, or may be implemented by using a PMOS transistor, an NMOS transistor, or the like. However, attention needs to be paid on a parameter such as an on resistance, a disconnection resistance, an overcurrent capability, and a resistance switch speed. In addition, a full silicon verification process is further needed, such as aging.

Optionally, in this embodiment of this application, more resistance switches are needed when a large target load current is supported, if a quantity of groups remains unchanged, it means that a quantity of resistance switches included in each resistance switch group increases, and a reaction time becomes slow. In addition, the large target load current means a relatively large target load area, and if the target load changes rapidly, the sensor cannot react in a timely manner. To resolve the foregoing problem, a concept of connecting output ends in parallel is put forward.

Figure 9:
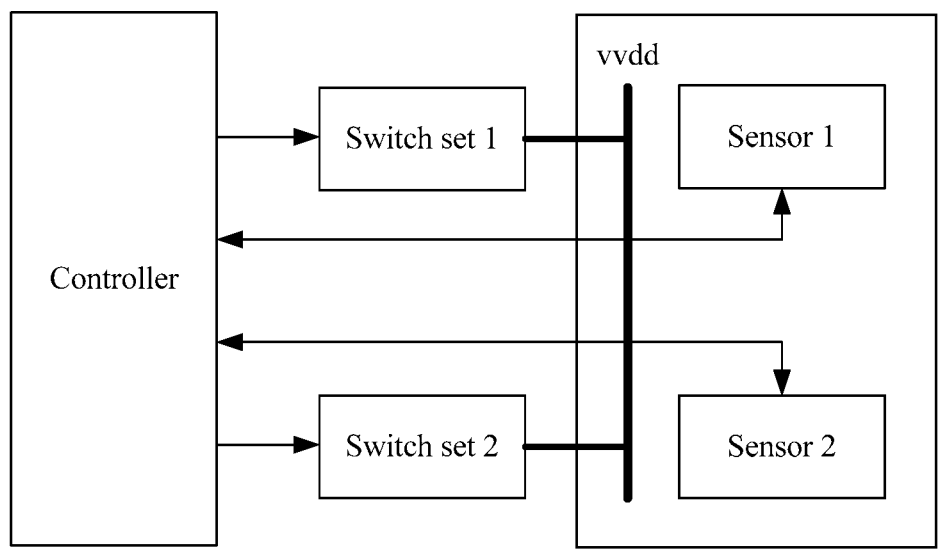
FIG. 9 is a schematic diagram of connections between a controller, a switch, and a sensor according to an embodiment of this application.

As shown in FIG. 9, the controller may obtain a status representation value of a node voltage of a detection point 1 of the target load that is sent by a sensor 1, and control disconnection and closure of a resistance switch group in a resistance switch set 1, and the controller may obtain a status representation value of a node voltage of a detection point 2 of the target load that is sent by a sensor 2, and control disconnection and closure of a resistance switch group in a resistance switch set 2. A resistance switch set includes at least one resistance switch group.

Therefore, in this embodiment of this application, multiple output ends may be connected in parallel, so that there is strong extensibility, and this may be applied to designs having different power consumption requirements.

Optionally, in this embodiment of this application, a detection point at which a voltage of the target load is measured may be located inside the target load, for example, may be located at a geometrical center of the target load, or may be located near a lowest drop point of the voltage of the target load.

Optionally, in this embodiment of this application, a regulation range of the supply voltage of the target load may include 0. For example, if the at least two switch groups are all disconnected, the supply voltage of the target load is 0. Therefore, the power gating array may further implement a power gating control function, and there is no need to additionally deploy a power gating control.

Therefore, the controller obtains the digital first status representation value sent by the sensor, where the digital first status representation value is used to represent the node voltage that is at the current moment and that is of the first detection point of the target load; and when determining to regulate the voltage of the target load, sends the digital control signal to the power gating array, so that full digital voltage regulation may be implemented, for example, an inner voltage of the target load is digitally monitored, and a voltage is digitally controlled. The full digital voltage regulation can resolve a problem that an on-chip power supply requires a digital-analog mixed design, and is easy to integrate and use. In addition, whether to regulate the supply voltage of the target load may be determined according to the first status representation value and the at least one of the second status representation value that is used to represent the node voltage of the detection point at the previous moment or the expected value of the node voltage of the detection point. It may be implemented to regulate the supply voltage with reference to the status representation value for the previous node voltage and the status representation value for the current node voltage, and this may avoid frequent changes of the voltage of the target load that is caused by frequent regulation of the supply voltage. In addition, the supply voltage of the target load may be regulated with reference to the status representation value for the current node voltage and the expected value of the node voltage, so that the voltage of the target load can further approach the expected value, so as to implement precise regulation of the supply voltage of the target load.

Further, because a digital signal is transmitted, a transmission rate is relatively high. For example, there may be a GHz running rate, a loop delay is relatively short, so that there are features of high transmission bandwidth and quick feedback.

In addition, in this embodiment of this application, because of an advantage of high transmission bandwidth, in a scenario in which switching needs to be performed quickly, voltage-frequency quick switching can be effectively supported by consuming fewer resources.

In addition, the controller, the target load, the sensor, and the power gating array are integrated on the chip, so as to implement on-chip management.

Figure 10:
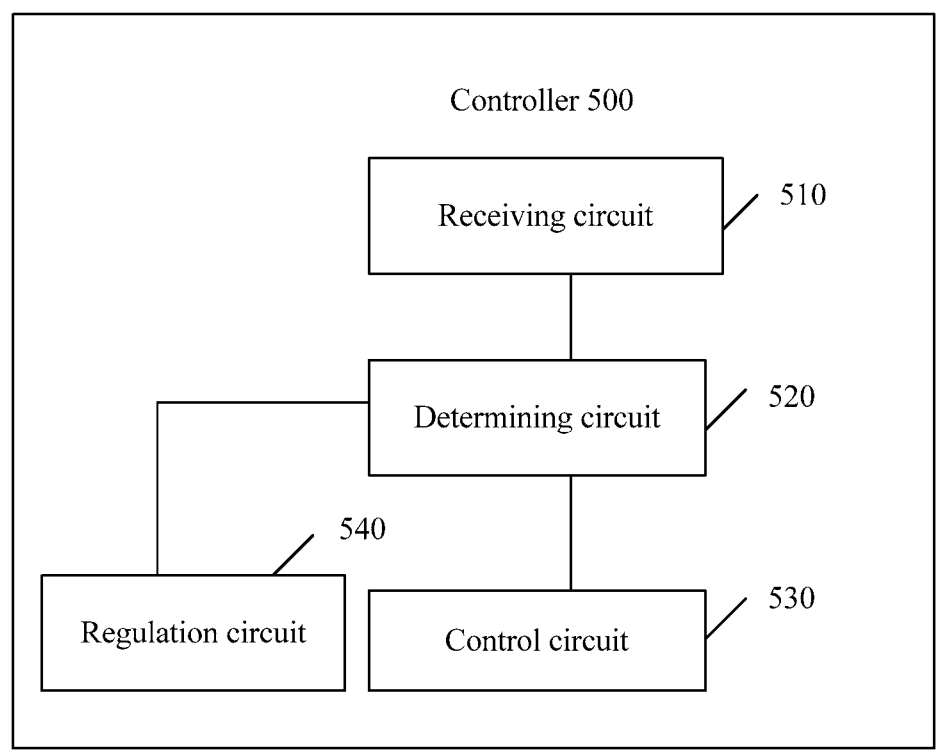
FIG. 10 is a schematic block diagram of a controller according to an embodiment of this application.

FIG. 10 is a schematic block diagram of a controller 500 according to an embodiment of this application. The controller 500 is disposed on a chip. Target load, a first sensor, and a power gating array are further disposed on the chip, the power gating array and the first sensor are separately coupled to the controller, the first sensor is configured to detect a node voltage that is at a current moment and that is of a first detection point of the target load, to generate a digital first status representation value, and the power gating array is configured to provide a supply voltage for the target load.

The controller 500 includes: a receiving circuit 510, configured to receive the first status representation value sent by the first sensor; a determining circuit 520, configured to determine, according to the first status representation value and at least one of a second status representation value or a first expected value, whether to regulate a supply voltage of the target load, where the second status representation value represents a node voltage that is at a previous moment and that is of the first detection point of the target load, and the first expected value represents an expected value of a node voltage of the first detection point; and a control circuit 530, configured to: when the determining circuit 520 determines to regulate the supply voltage of the target load, send a digital control signal to the power gating array, to control the power gating array to regulate the supply voltage.

Optionally, reference load and a second sensor coupled to the controller are further disposed on the chip. A supply voltage of the reference load is a constant voltage, and the second sensor is configured to detect a node voltage that is at a current moment and that is of a second detection point of the reference load, to generate a third status representation value. The controller 500 further includes a regulation circuit 540, configured to obtain the third status representation value from the second sensor, and regulate a second expected value according to a variation of the third status representation value relative to a fourth status representation value, to obtain the first expected value. The fourth status representation value represents an initial node voltage of the second detection point, and the second expected value represents an initial expected value of the node voltage of the first detection point. Alternatively, the fourth status representation value represents a node voltage of the second detection point at a previous moment, and the second expected value represents an expected value that is at a previous moment and that is of the node voltage of the first detection point.

Optionally, the regulation circuit 540 is further configured to regulate the second expected value by using the following formula to obtain the first expected value: $y=y_0+c(m-m_0)$, where y indicates the first expected value, $y_0$ indicates the second expected value, m indicates the third status representation value, $m_0$ indicates the fourth status representation value, and c is a constant.

Optionally, the determining circuit 520 is further configured to: determine a reference parameter t by using the following formula: $t=a(x-y)+b(x-z)$, where t is the reference parameter, x is the first status representation value, y is the first expected value, z is the second status representation value, and a and b are constants; and determine, according to the reference parameter, whether to regulate the supply voltage of the target load.

Optionally, the determining circuit 520 is further configured to: when an absolute value of the reference parameter is greater than or equal to a first preset value, determine to regulate the supply voltage of the target load; or when an absolute value of the reference parameter is less than the first preset value, determine not to regulate the supply voltage of the target load.

Optionally, the power gating array includes at least two resistance switch groups. The at least two resistance switch groups are connected in parallel, each resistance switch group includes at least one resistance switch, and the power gating array and the target load are connected in series. The control circuit 530 is further configured to: when the reference parameter is greater than or equal to the first preset value, and is less than a second preset value, send the control signal to the power gating array according to a preset quantity of to-be-switched resistance switch groups, so that the power gating array switches the preset quantity of resistance switch groups.

Optionally, the power gating array includes at least two resistance switch groups. The at least two resistance switch groups are connected in parallel, each resistance switch group includes at least one resistance switch, and the power gating array and the target load are connected in series. The determining circuit 520 is further configured to: when the reference parameter is greater than or equal to the second preset value, determine, according to the reference parameter, a quantity of resistance switch groups that need to be switched; and the control circuit 530 is further configured to send the control signal to the power gating array according to the determined quantity of resistance switch groups that need to be switched, so that the power gating array switches the quantity of resistance switch groups determined by the controller.

It should be understood that, the controller 500 may be corresponding to the controller above, and may implement a corresponding function of the controller. For brevity, details are not described herein.

An embodiment of this application provides a chip. The chip includes a controller, target load, a first sensor, and a power gating array. The power gating array and the first sensor are separately coupled to the controller. The first sensor is configured to detect a node voltage that is at a current moment and that is of a first detection point of the target load, to generate a digital first status representation value. The controller is configured to: receive the first status representation value sent by the first sensor; determine, according to the first status representation value and at least one of a second status representation value or a first expected value, whether to regulate a supply voltage of the target load, where the second status representation value represents a node voltage that is at a previous moment and that is of the first detection point of the target load, and the first expected value represents an expected value of a node voltage of the first detection point; and when determining to regulate the supply voltage of the target load, send a digital control signal to the power gating array, to control the power gating array to regulate the supply voltage. The power gating array is configured to provide a supply voltage for the target load according to the control signal sent by the controller.

Optionally, the controller disposed on the chip may be corresponding to the controller above, and my implement a corresponding function of the controller. The sensor disposed on the chip may be corresponding to the sensor above, and may implement a corresponding function of the sensor. The power gating array disposed on the chip may be corresponding to the power gating array mentioned above, and may implement a corresponding function of the power gating array. For brevity, details are not described herein.

Optionally, a structure of the chip may be the chip 100 shown in FIG. 1 or FIG. 6. For brevity, details are not repeatedly described.

It may be clearly understood by a person skilled in the art that, for the purpose of convenient and brief description, for a detailed working process of the foregoing system and apparatus, refer to a corresponding process in the foregoing method embodiments, and details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for regulating a supply voltage of a target load disposed on a chip, wherein a controller, a first sensor, and a power gating array are further disposed on the chip, the power gating array and the first sensor are separately coupled to the controller, the first sensor is configured to detect a node voltage that is at a current moment and that is of a first detection point of the target load, to generate a digital first status representation value, and the power gating array is configured to provide a supply voltage for the target load; and the method comprises:

receiving, by the controller, the first status representation value sent by the first sensor;

determining, by the controller, a reference parameter according to the following formula:

$t=a(x-y)+b(x-z)$, wherein t is the reference parameter, x is the first status representation value, y is a first expected value represents an expected value of a node voltage of the first detection point, z is a second status representation value represents a node voltage that is at a previous moment and that is of the first detection point of the target load, and a and b are constants; and determining, by the controller according to the reference parameter, whether to regulate the supply voltage of the target load; and when determining to regulate the supply voltage of the target load, sending, by the controller, a digital control signal to the power gating array, to control the power gating array to regulate the supply voltage.

2. The method according to claim 1, wherein a reference load and a second sensor coupled to the controller are further disposed on the chip, wherein a supply voltage of the reference load is a constant voltage, and the second sensor is configured to detect a node voltage that is at a current moment and that is of a second detection point of the reference load, to generate a third status representation value; and the method further comprises:

obtaining, by the controller, the third status representation value from the second sensor, and regulating a second expected value according to a variation of the third status representation value relative to a fourth status representation value, to obtain the first expected value, wherein:

the fourth status representation value represents an initial node voltage of the second detection point, and the second expected value represents an initial expected value of the node voltage of the first detection point; or the fourth status representation value represents a node voltage of the second detection point at a previous moment, and the second expected value represents an expected value that is at a previous moment and that is of the node voltage of the first detection point.

3. The method according to claim 2, wherein the regulating a second expected value according to a variation of the third status representation value relative to a fourth status representation value, to obtain the first expected value comprises:

regulating, by the controller, the second expected value by using the following formula, to obtain the first expected value:

$y=y_0+c(m-m_0)$, wherein y indicates the first expected value, $y_0$ indicates the second expected value, m indicates the third status representation value, $m_0$ indicates the fourth status representation value, and c is a constant.

4. The method according to claim 1, wherein the determining whether to regulate the supply voltage of the target load comprises:

when an absolute value of the reference parameter is greater than or equal to a first preset value, determining, by the controller, to regulate the supply voltage of the target load; or when an absolute value of the reference parameter is less than a first preset value, determining not to regulate the supply voltage of the target load.

5. The method according to claim 4, wherein the power gating array comprises at least two resistance switch groups, the at least two resistance switch groups are connected in parallel, each resistance switch group comprises at least one resistance switch, and the power gating array and the target load are connected in series; and the sending, by the controller, of a digital control signal to the power gating array comprises:

when the reference parameter is greater than or equal to the first preset value, and is less than a second preset value, sending, by the controller, the digital control signal to the power gating array according to a preset quantity of to-be-switched resistance switch groups, so that the power gating array switches the preset quantity of resistance switch groups according to the digital control signal.

6. The method according to claim 4, wherein the power gating array comprises at least two resistance switch groups, the at least two resistance switch groups are connected in parallel, each resistance switch group comprises at least one resistance switch, and the power gating array and the target load are connected in series; and the sending, by the controller, of a digital control signal to the power gating array comprises:

when the reference parameter is greater than or equal to a second preset value, determining, by the controller according to the reference parameter, a quantity of resistance switch groups that need to be switched, and sending the digital control signal to the power gating array according to the determined quantity of resistance switch groups that need to be switched, so that the power gating array switches the determined quantity of resistance switch groups according to the digital control signal.

7. A controller, wherein the controller is disposed on a chip, wherein a target load, a first sensor, and a power gating array are further disposed on the chip, the power gating array and the first sensor are separately coupled to the controller, the first sensor is configured to detect a node voltage that is at a current moment and that is of a first detection point of the target load, to generate a digital first status representation value, and the power gating array is configured to provide a supply voltage for the target load; and the controller comprises:

a receiving circuit, configured to receive the first status representation value sent by the first sensor;

a determining circuit, configured to determine a reference parameter by using the following formula:

$t=a(x-y)+b(x-z)$, wherein t is the reference parameter, x is the first status representation value, y is a first expected value represents an expected value of a node voltage of the first detection point, z is a second status representation value represents a node voltage that is at a previous moment and that is of the first detection point of the target load, and a and b are constants; and determine, according to the reference parameter, whether to regulate the supply voltage of the target load; and a control circuit, configured to: when the determining circuit determines to regulate the supply voltage of the target load, send a digital control signal to the power gating array, to control the power gating array to regulate the supply voltage.

8. The controller according to claim 7, wherein a reference load and a second sensor coupled to the controller are further disposed on the chip, wherein a supply voltage of the reference load is a constant voltage, and the second sensor is configured to detect a node voltage that is at a current moment and that is of a second detection point of the reference load, to generate a third status representation value; and the controller further comprises:
a regulation circuit, configured to obtain the third status representation value from the second sensor, and regulate a second expected value according to a variation of the third status representation value relative to a fourth status representation value, to obtain the first expected value, wherein:
the fourth status representation value represents an initial node voltage of the second detection point, and the second expected value represents an initial expected value of the node voltage of the first detection point; or
the fourth status representation value represents a node voltage of the second detection point at a previous moment, and the second expected value represents an expected value that is at a previous moment and that is of the node voltage of the first detection point.

9. The controller according to claim 8, wherein the regulation circuit is further configured to:
regulate the second expected value by using the following formula, to obtain the first expected value:

$y = y_0 + c(m - m_0)$, wherein y indicates the first expected value, $y_0$ indicates the second expected value, m indicates the third status representation value, $m_0$ indicates the fourth status representation value, and c is a constant.

10. The controller according to claim 7, wherein the determining circuit is further configured to:
when an absolute value of the reference parameter is greater than or equal to a first preset value, determine to regulate the supply voltage of the target load; or
when an absolute value of the reference parameter is less than the first preset value, determine not to regulate the supply voltage of the target load.

11. The controller according to claim 10, wherein the power gating array comprises at least two resistance switch groups, the at least two resistance switch groups are connected in parallel, each resistance switch group comprises at least one resistance switch, and the power gating array and the target load are connected in series; and
the control circuit is further configured to: when the reference parameter is greater than or equal to the first preset value, and is less than a second preset value, send the digital control signal to the power gating array according to a preset quantity of to-be-switched resistance switch groups, so that the power gating array switches the preset quantity of resistance switch groups.

12. The controller according to claim 10, wherein the power gating array comprises at least two resistance switch groups, the at least two resistance switch groups are connected in parallel, each resistance switch group comprises at least one resistance switch, and the power gating array and the target load are connected in series; and
the determining circuit is further configured to: when the reference parameter is greater than or equal to a second preset value, determine, according to the reference parameter, a quantity of resistance switch groups that need to be switched; and
the control circuit is further configured to send the digital control signal to the power gating array according to the determined quantity of resistance switch groups that need to be switched, so that the power gating array switches the determined quantity of resistance switch groups.

13. A chip, wherein the chip comprises a controller, a target load, a first sensor, and a power gating array, wherein:
the power gating array and the first sensor are separately coupled to the controller;
the first sensor is configured to detect a node voltage that is at a current moment and that is of a first detection point of the target load, to generate a digital first status representation value;
the controller is configured to:
receive the first status representation value sent by the first sensor;
determine a reference parameter according to the following formula: $t = a(x-y) + b(x-z)$, wherein t is the reference parameter, x is the first status representation value, y is a first expected value represents an expected value of a node voltage of the first detection point, z is a second status representation value represents a node voltage that is at a previous moment and that is of the first detection point of the target load, and a and b are constants; determine, according to the reference parameter, whether to regulate the supply voltage of the target load; and
when determining to regulate the supply voltage of the target load, send a digital control signal to the power gating array, to control the power gating array to regulate the supply voltage; and
the power gating array is configured to provide the supply voltage for the target load according to the digital control signal sent by the controller.

14. The chip according to claim 13, wherein the chip further comprises a reference load and a second sensor coupled to the controller, wherein a supply voltage of the reference load is a constant voltage; and
the controller is further configured to: obtain a third status representation value from the second sensor, and regulate a second expected value according to a variation of the third status representation value relative to a fourth status representation value, to obtain the first expected value, wherein:
the fourth status representation value represents an initial node voltage of a second detection point, and the second expected value represents an initial expected value of the node voltage of the first detection point; or
the fourth status representation value represents a node voltage of the second detection point at a previous moment, and the second expected value represents an expected value that is at a previous moment and that is of the node voltage of the first detection point.

15. The chip according to claim 14, wherein the controller is further configured to:
regulate the second expected value by using the following formula, to obtain the first expected value:

$y = y_0 + c(m - m_0)$, wherein y indicates the first expected value, $y_0$ is the second expected value, m indicates the third status representation value, $m_0$ indicates the fourth status representation value, and c is a constant.

16. The chip according to claim 13, wherein the controller is further configured to:
- when an absolute value of the reference parameter is greater than or equal to a first preset value, determine to regulate the supply voltage of the target load; or
- when an absolute value of the reference parameter is less than the first preset value, determine not to regulate the supply voltage of the target load.

17. The chip according to claim 16, wherein the power gating array comprises at least two resistance switch groups, the at least two resistance switch groups are connected in parallel, each resistance switch group comprises at least one resistance switch, and the power gating array and the target load are connected in series;
- wherein the controller is further configured to: when the reference parameter is greater than or equal to the first preset value, and is less than a second preset value, send the digital control signal to the power gating array according to a preset quantity of to-be-adjusted resistance switch groups; and
- wherein the power gating array is further configured to switch the preset quantity of resistance switch groups according to the digital control signal.

* * * * *